United States Patent [19]
Lemont et al.

[11] 3,895,162
[45] July 15, 1975

[54] COMPOSITE METAL FIBER WOOL RESIN PRODUCT AND METHOD

[75] Inventors: Harold E. Lemont, Calabasas; Robert C. Miller, Encino, both of Calif.

[73] Assignee: Summa Corporation, Culver City, Calif.

[22] Filed: Feb. 16, 1973

[21] Appl. No.: 332,999

[52] U.S. Cl. ............... 428/292; 156/166; 156/181; 428/221; 161/144; 161/156; 161/170; 260/37 EP; 260/37 M; 264/229; 29/180 S; 29/183.5; 109/83; 428/293
[51] Int. Cl. .................... B32b 5/08; D06m 15/26
[58] Field of Search ............ 161/88, 36, 47, 60, 70, 161/140, 151, 152, 170, 144, 156; 156/42, 148, 166, 172, 180, 181, 306; 260/37 EP, 37 M, 41 B, 42.22; 264/DIG. 19, 229; 117/132 BE, 128.4; 52/600; 109/83; 29/180 S, 183.5

[56] References Cited
UNITED STATES PATENTS

| | | | |
|---|---|---|---|
| 3,276,928 | 10/1966 | Pearson | 161/156 |
| 3,410,936 | 11/1968 | Juras | 264/128 X |
| 3,595,731 | 7/1971 | Davies | 161/156 |
| 3,669,823 | 6/1972 | Wood | 161/156 |
| 3,773,603 | 11/1973 | Scholander | 161/151 |

Primary Examiner—Marion E. McCamish
Attorney, Agent, or Firm—Ellsworth R. Roston

[57] ABSTRACT

A structural material having a multiplicity of high strength filaments therein which have significant length-to-diameter ratios and are mechanically interlocked with each other to form a wool having substantially isotropic strength characteristics. A bonding material, which impregnates the interstices of the wool, is bonded to the filaments to distribute internal stresses throughout the structural material. The wool has a structural integrity even in the absence of the bonding material and provides the structural material with tensile and shear strengths which are significantly greater than those of the bonding material. The structural material has a relatively high strength-to-density ratio and may have fatigue characteristics superior to those of some metals.

10 Claims, 8 Drawing Figures

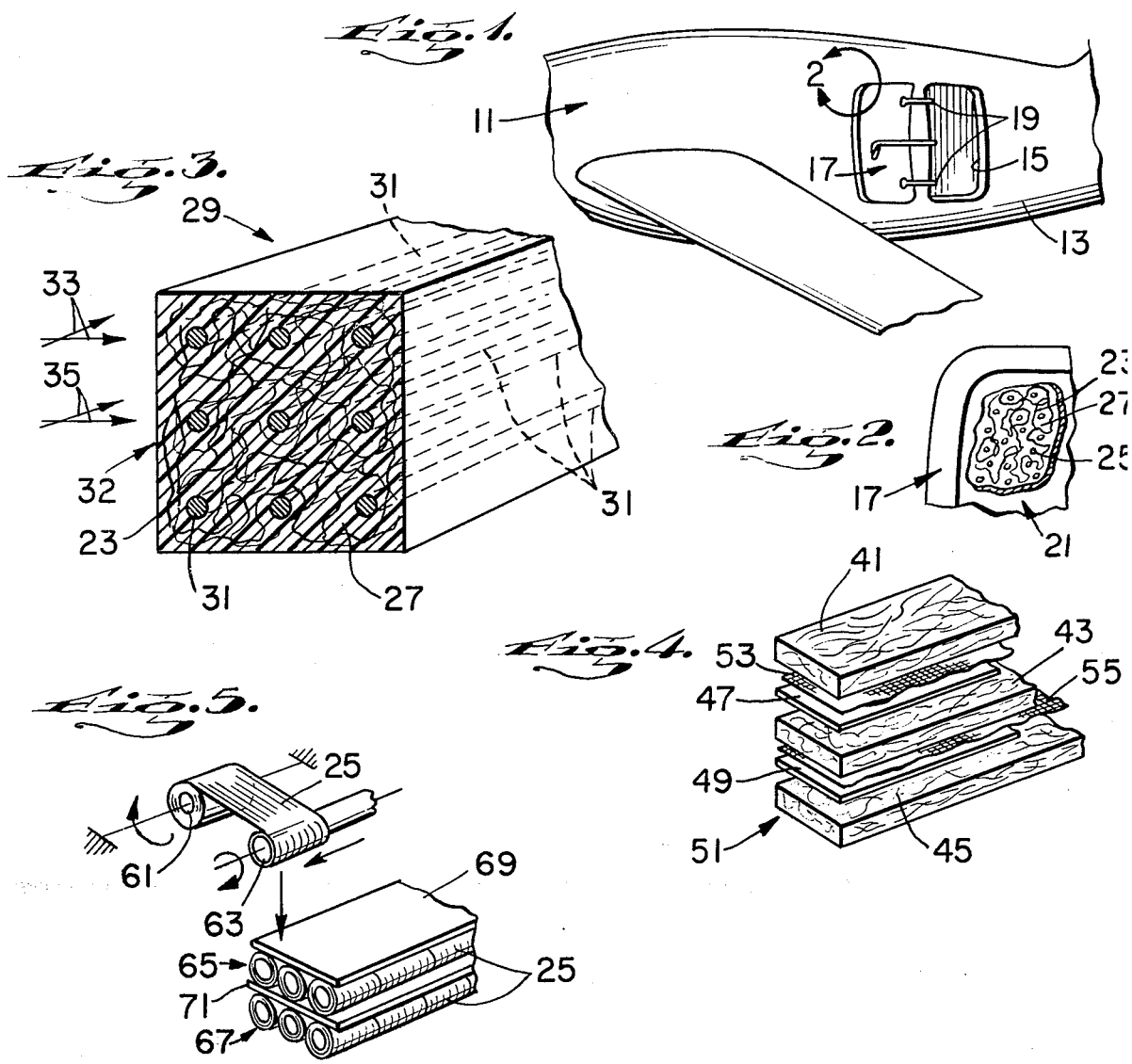
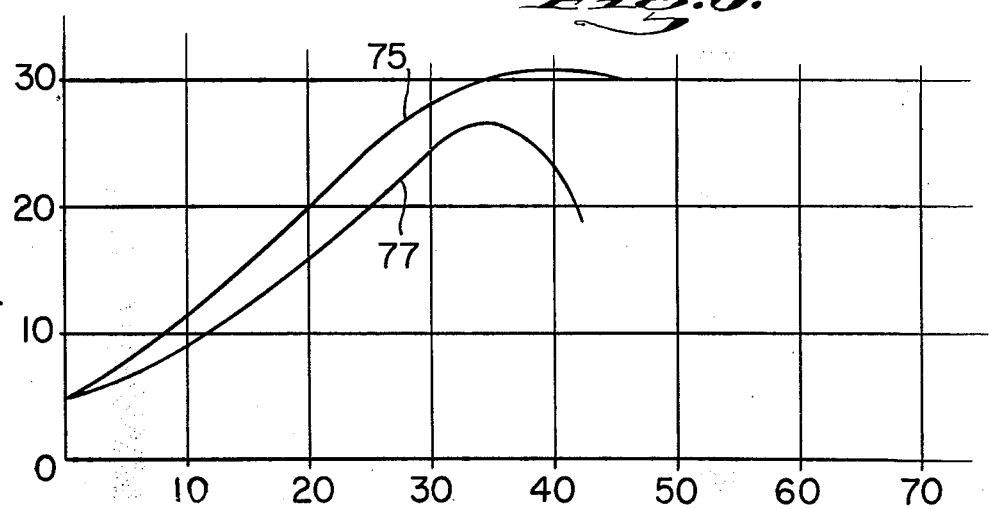

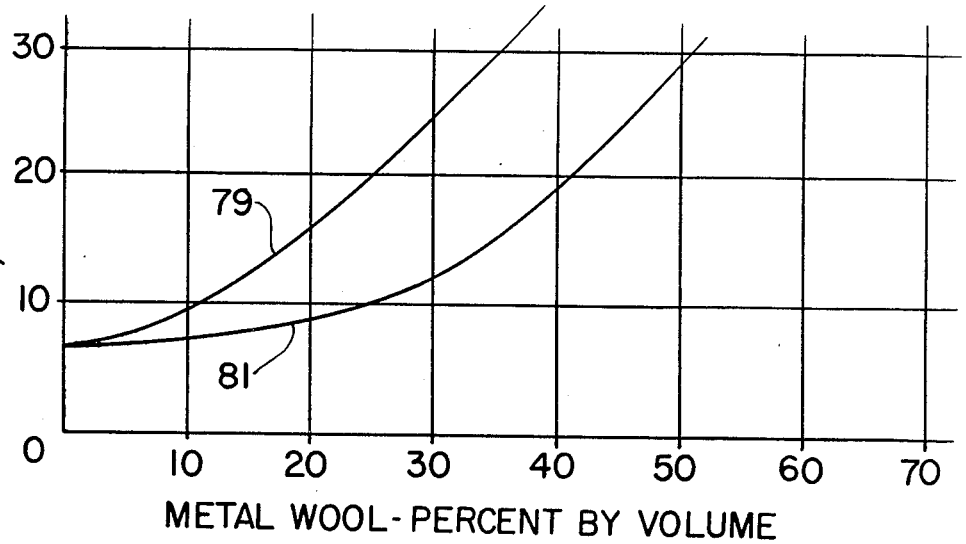
Fig. 7.
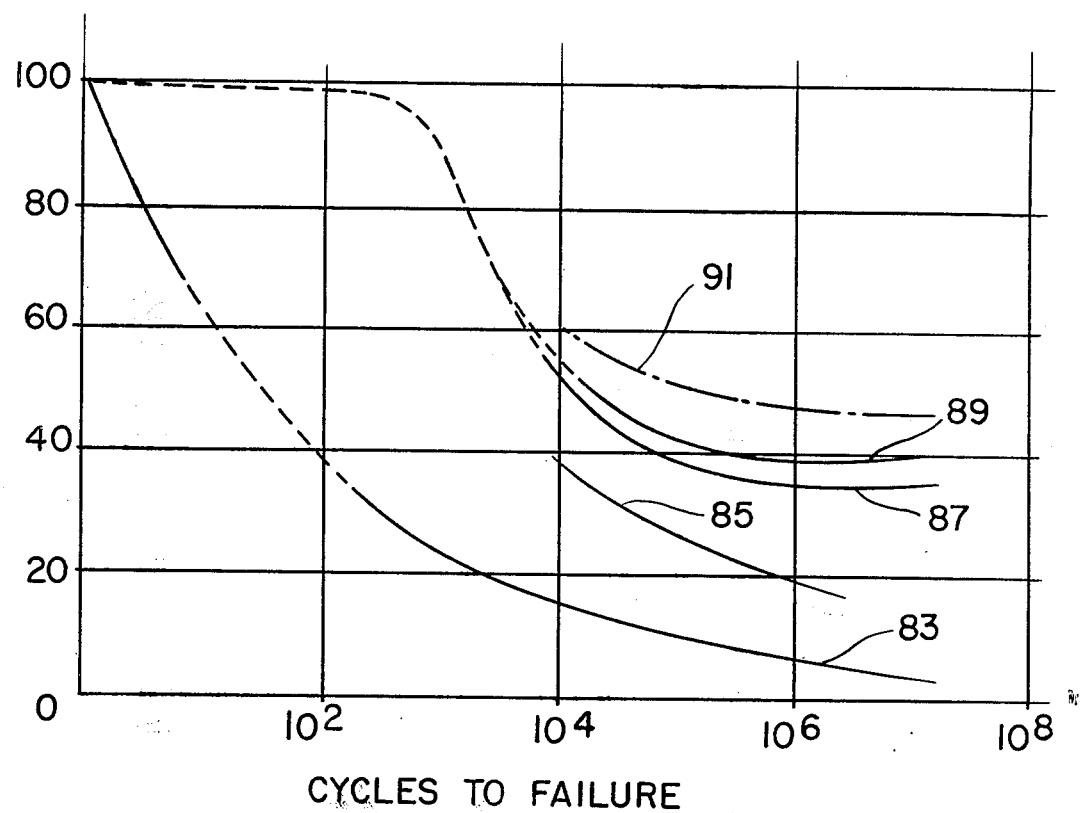
Fig. 8. (FILAMENT FATIGUE)

COMPOSITE METAL FIBER WOOL RESIN PRODUCT AND METHOD

BACKGROUND OF THE INVENTION

1. Field of the Invention

This invention relates generally to structural composites and more specifically to reinforced matrices included therein in which the matrix bonding material is bonded to a fibrous wool dispersed within the matrix.

2. Description of the Prior Art

A material having a physical property which is attractive to satisfy a particular design criteria may not be permitted to fully utilize its desirable property in a given application due to other less desirable properties of the material. For example, a material having a desirable high tensile strength may have a particularly low fatigue tolerance so that under fatigue it fails at loads significantly lower than the maximum tensile strength. The physical limitations of a material are particularly apparent in the design of structures where many of the following parameters are design goals: tensile strength, fatigue strength, weight, reduced radar signature, thermal and electrical conductivity, temperature performance, and fail-safe performance.

Structural components are often formed from solid metals because metals typically have relatively high tensile strengths and a high modulus of elasticity. However, solid metals typically have surface flaws which tend to propagate under stress so that the metals fail at a magnitude of stress far below the theoretical strength of the material. Solid metals also have a relatively high density which is generally undesirable for aircraft application.

Aluminum castings have been desirable for their relatively low density. However, whereas aluminum is generally thought to have a tensile strength of 40,000 psi, this property can be substantially degraded depending upon the intricacy of the casting. Also, metal castings are particularly susceptible to the formation of notches which cause significant stress concentrations in the castings. The failure which may occur as a result of a particular stress concentration is commonly referred to as the notch effect. It is also known that aluminum castings have a relatively low ballistic tolerance. As a result of these deficiencies, the aluminum castings of the prior art are typically designed with a safety factor which reduces the strength-to-density ratio to 100,000 inches.

When a single material cannot satisfy all of the design criteria, a combination of materials, typically referred to as a composite, may be designed to maximize the desirable properties of each of the contributing materials. For example, a typical structural composite might include a material of high tensile strength and high modulus of elasticity embedded in a material having a low modulus of elasticity but characteristics for preventing crack propagation. In such a composite the material having a low elasticity typically distributes the stresses over the high strength material to maximize the favorable characteristics and minimize the unfavorable characteristics of each of the materials.

Structural composites have been formed from matrices including thermosetting resins which have been reinforced with primary strength elements including generally straight metal wires and woven materials such as cloth, screen and gauze. A limiting property of these composites has been the relatively low shear strength of the resin. Whereas the primary elements have had tensile strengths as high as 500,000 pounds per square inch (psi), the resins have typically failed under interlaminar shear stresses of only 6,000 psi.

Various materials, typically having a chopped configuration, have been disposed in a resin to form a matrix between high strength elements. For example, glass and boron fibers have been randomly disposed in a resin to increase its shear strength. Since the fibers have been randomly disposed primarily in only two dimensions, the strength characteristics of the matrix have been anisotropic. The fibers in such prior art matrices typically have had a relatively low length-to-diameter ratio, hereinafter referred to as the aspect ratio.

The fibers in the matrices of the prior art have also been deficient in their ability to be significantly bent and kinked to substantially interlock with each other and form a material having a structural integrity. For example, glass and boron fibers have typically been broken when they have been bent on a small radius. Thus, any interaction of the fibers in the prior art with themselves has not significantly increased the strength of the composites.

SUMMARY OF THE INVENTION

In the present invention, a structural material is formed from a multiplicity of filaments having relatively high aspect ratios which are interlocked with each other to form a wool. The wool can be formed from organic and inorganic filaments including textile fibers and polymer fibers. A bonding material is disposed in the interstices of the wool and bonds with the filaments to distribute any internal stresses throughout the structural material. The filaments may have a kinky configuration which augments the formation of mechanical bridges within the wool, and may also have a scaly texture to facilitate the bond with the bonding material and to further enhance the structural integrity of the wool. The filaments also generally have relatively small diameters which permit higher filament concentrations in the structural material. The filaments also generally have a substantial length, not only to enhance the mechanical interlocking of the filaments to form a wool, but also to assist in the distribution of stresses throughout the matrix. This has significantly increased the tensile performance of the structural material.

In the wool, the filaments extend a significant distance in all three dimensions so that the high strength characteristics of the structural material are substantially isotropic, i.e., uniform in all directions. Furthermore, the omnidirectional interlocking filaments of the wool provide the structural material with a resistance to the propagation of cracks which may result from causes such as bullet strikes. This enables the structural material to be designed with a safety factor which may be substantially decreased from that heretofore applied to aluminum structures to account for notch effects and local stress intensities. The weight or volume ratio of the wool to the bonding material in the matrix can be scaled to provide the optimum strength-to-density ratio for a specific structural application. The performance of the wool may also be further controlled by varying the diametral and length dimensions of the filaments and the density to which they may be compacted before bonding with the bonding material.

The bonding material can include any material which has the desired strength, elasticity, etc., for a particular use application and which may be adherently bonded to the filaments of the wool so that stresses are transferred from the bonding material to the filaments of the wool in uniformly distributing the stresses throughout the structural material. For particular applications, plastics, such as polyamides, fluorocarbons and epoxies have been found particularly desirable as a bonding material, not only due to their strength and elastic characteristics, but also because they are easily formed to provide a desired shape to an article formed of the structural material.

In some of the preferred embodiments of the invention, the filaments of the wool are formed of metals, such as stainless steel, and the bonding material includes in epoxy resin. The use of metallic filaments in the wool is particularly desirable because of the high modulus of elasticity and high tensile strength of metal filaments. Furthermore, metal filaments can be readily kinked to provide abrupt changes in the direction of the filaments. The kinks significantly aid in the interlocking of the filaments to enhance the structural integrity of the wool. Additionally, the metal filaments can be drawn through a vibrating orifice to work harden the filaments and provide them with tensile strengths as high as 500,000 psi.

The addition of the wool to the bonding material significantly increases the strength characteristics of the structural material. Both tensile and shear strengths have been increased by more than 400% over that of the bonding material alone. The fatigue performance of a stainless steel wool/epoxy bonding material is even better than that of solid materials such as aluminum. Furthermore, after 1,000,000 fatigue cycles, such a material will typically have a higher tensile strength than solid aluminum. The structural material can be extremely lightweight so that its strength-to-density ratio makes it a highly satisfactory substitute for aluminum castings.

These and other features and advantages of the invention will become more apparent with a description of the preferred embodiments illustrated in the associated drawings.

DESCRIPTION OF THE DRAWINGS

FIG. 1 is a partial perspective view of an airplane having a hatch cover formed from a structural material of the present invention;

FIG. 2 is a magnified view of a portion of the hatch cover shown in FIG. 1;

FIG. 3 is a perspective view of a composite including a structural material of the present invention as the matrix;

FIG. 4 is an illustration of one method of forming the structural material;

FIG. 5 is an illustration of a further method of forming a structural material of the invention;

FIG. 6 is a graph showing the tensile strength of structural materials of the invention which contain varying percentages of a wool adherently embedded in the bonding material;

FIG. 7 is a graph showing the shear strength of structural materials with varying percentages of a wool in the material; and FIG. 8 is a graph showing the fatigue characteristics of a structural material of the invention wherein the percentage of maximum tensile stress of the material is plotted against varying cycles to failure.

DESCRIPTION OF PREFERRED EMBODIMENTS

An airplane is shown in FIG. 1 and designated generally by the reference numeral 11. The airplane 11 is illustrated to include a fuselage 13 having a hole in the side thereof typically referred to as a hatch 15. A hatch cover 17, which can be pivotally mounted on the fuselage 13 by a pair of hinges 19, provides a means for sealing the hatch 15.

A portion of the hatch cover 17 is significantly magnified in FIG. 2 to illustrate the structural material 21 which forms the hatch cover 17. The structural material 21 includes a plurality of filaments 23 mechanically interlocked to form a wool 25. The interstices of the wool 25 are impregnated with a bonding material 27 which functions to bond the filaments 23 so that internal stresses are distributed throughout the structural material 21. Of course, the hatch cover 17 is merely representative of many structural components such as doors, bulkheads, gear cases and castings which can be formed from the structural material 21.

The filaments 23 can be formed from any organic or inorganic, metallic or nonmetallic material which is compatible with the bonding agent 27. It is necessary, of course, that the material have properties for being formed into the filaments 23 which can be interlocked to form a wool 25. Such materials may include nonmetallic materials, e.g., graphite, carbon, rayon, flax, polyesters, cellulose, cellulose acetate, cotton and nylon. Some of these materials may have properties, such as reduced strength after prolonged heating, which make them undesirable for a particular design application.

The filaments 23 can be formed from textile fibers. Such fibers typically experience three types of distortion when subjected to load: an elastic deformation, recoverable upon load removal; a primary creep, recoverable upon load removal; and a secondary creep that is non-recoverable upon load removal. The relative amounts of these kinds of distortion produce a total deformation which will vary with the particular textile fiber. Primary and secondary creep give rise to mechanical hysteresis on loading and unloading.

The filaments 23 also can be formed from polymer materials to provide mechanical and chemical properties particularly desirable for a particular specialized application. Representative of the polymer materials are the polyester fibers as made from polyethylene terephthalate. The wool 25 can also be formed form acrylic and modacrylic fibers made from copolymers of acrylonitrile and other chemicals. Polymers including those composed essentially of vinylidene chloride, and olefins, including the polyethylenes and the polypropylenes may also be employed in forming the filaments 23.

As noted, the structural material 21 is particularly adaptable for forming structures, such as the hatch cover 17, which desirably have a high strength-to-weight ratio. The greater the strength of the wool 25 and bonding material 27, the greater will be the strength of the resulting structural material 21. For this reason, the filaments 23 are preferably formed from metals which are commonly known to have a high tensile strength and a high modulus of elasticity. Metals such as stainless steel, chromium, nickel, platinum, titanium, copper, aluminum, beryllium, and tungsten are representative of metals which, either alone or in the form of an alloy, may be utilized to provide high strength characteristics for the filaments 23.

The wool 25 can also be formed form high tensile filaments such as carbon steel rocket wire which typically has a tensile strength of 309,000 psi. A particular rocket wire manufactured by National Standard Company and designated with the tradename NS-355 has a tensile strength of 343,000 psi. The NS-355 is particularly useful because it has a relatively high modulus of elasticity of 29,000,000 psi. The filaments 23 may also be formed from the metallic wires designated by the tradename Elgiloy Wire and manufactured by the Elgiloy Company. These wires have a tensile strength of 288,000 psi. Additionally, the Type 302 stainless steel wire produced by the Hackensack Cable Corporation can provide a tensile strength of 280,000 psi.

A particularly desirable material for the filaments 23 is an organic fiber designated by the trademark PRD-49 and manufactured by the DuPont Corporation. This material has a density of 0.053 pound per cubic inch and a tensile strength of 400,000 psi which provide the PRD-49 with a tensile strength-to-density ratio of $7.55 \times 10^6$ inches. The PRD-49 also has a modulus of elasticity in excess of 20,000,000 psi.

The bonding material 27 can be any material which forms a bond with the filaments 23 to provide for the distribution of internal stresses throughout the structural material 21. The bonding material 27 does not necessarily adhere to the filaments 23 but it at least forms a generally solid material around the filaments 23 to inhibit the withdrawal of the filaments 23 in response to tensile loads thereon. Nonadhesive bonding materials may be used, for example, with a wool 25 having highly kinked filaments 23. At each of the kinks, the bonding material 27 will form a sharp corner about which the associated filament would have to be pulled if it were to be withdrawn from the bonding material 27. A significant number of kinks in a single filament will insure that the filament is not withdrawn from the bonding material in response to a tensile load. Rather, it is bonded by the bonding material 27 so that it resists the tensile load with its full tensile strength.

Relatively brittle materials, such as some plastics may be desirable for the bonding material 27 to meet the design goals of a particular structural material 21. Elastomers have also been found particularly desirable not only because of their elastic characteristics, but also because they can be easily formed to provide a desired shape. Synthetic elastomers including the polyamides, fluorocarbons and epoxies are preferred since they typically provide tensile and shear strengths in a range of 1,500 to 15,000 psi. Thermosetting resins and also thermoplastic resins are particularly desirable for the bonding material 27 since they can be heated to provide fluid characteristics desirable for impregnating the wool 25 and can be polymerized to provide high stength characteristics. Thermosetting resins, such as those designated by the trademarks FM-123 and FR-7035, which are manufactured by American Cyanamid Company and Fiberresins, Inc., respectively, have been found particularly adaptable for the bonding material 27. The thermosetting and thermoplastic resins typically provide tensile and shear strengths in the range of 4,000 to 6,500 psi.

In general, it is desirable that the bonding material 27 be compatible with the material of the filaments 23. For example, the filaments 23 should not be deleteriously affected by any heat treatment which may be used to liquify the bonding material 27. Furthermore, the material forming the filaments 23 should not be soluble in the bonding material 27.

It is of particular importance that the filaments 23 be mechanically interlocked to form a wool having some structural integrity even in the absence of the bonding material 27. Thus, it is desirable that the filaments 23 mechanically interlock to an extent that the lifting of a single filament 23 will typically result in the lifting of substantially all of the filaments 23. The wool 25 can be any substance having a generally fleecy configuration and consisting of a mass of the filaments 23 snarled together so that each of the filaments 23 forms a mechanical bridge with a multiplicity of the other filaments 23 to provide the wool 25 with its structural integrity. If the filaments 23 of the wool 25 include metals, such as stainless steel, they can be significantly kinked to enhance the interlocking characteristics and hence the structural integrity of the wool 25. The wool 25 also can generally be compressed to facilitate the interlocking of the filaments 23.

It is generally desirable that the filaments 23 have a relatively small diametral dimension so that they can be randomly interspersed throughout the bonding material 27 to provide the structural material 21 with generally homogeneous properties. It is also generally desirable that the filaments 23 have a substantial length to facilitate the interlocking of the filaments 23 to provide isotropic properties for the wool 25 and to thereby enhance the distribution of stresses throughout the structural material 21. To obtain the advantages of both these characteristics, it is preferable that the filaments 23 have an aspect ratio of at least 12,500. For example, in one embodiment of the stainless steel wool 25, the filaments 23 have a typical diameter of 4 microns and a typical length of 2 inches.

The filaments 23 of the wool 25 extend in random directions throughout the bonding material 27 to provide the structural material 21 with significant strength characteristics in all directions. For example, if the structural material 21 is placed in tension in any direction, a significant number of particular filaments 23 will also be placed in tension. Failure of the material 21 will occur if these particular filaments 23 break under the tensile stress. However, the significant tensile strength of the filaments 23 resists this breakage and provides the structural material 21 with its significant strength characteristics. Furthermore, the random orientation of the filaments provides the structural material 21 with its significant strength characteristics without regard to the direction of the stress.

It has been found that if all of the filaments 23 are oriented in a particular direction, and the material 21 is placed in tension in the particular direction, the material 21 will have a particular tensile strength. In comparison, if the filaments 23 are randomly oriented in the wool 25, the tensile strength of the material 21 will be approximately 25 to 30% of the particular tensile strength without regard to the direction of the tensile stress. From this comparison it can be appreciated that a failure of the structural material 21 due to tensile stress in any direction will be resisted by the tensile strength of about 25 to 30% of the filaments 23.

The strength of a particular composite, such as the beam 29 illustrated in FIG. 3, can be enhanced by interposing a plurality of primary strength elements 31 within a matrix 32 which is the structural material 21. The primary strength elements 31 typically extend in a particular direction to enhance the strength of the composite in the particular direction. The primary strength elements 31 may be formed from materials having a high tensile strength, such as 500,000 psi. These materials will typically be metals which can be formed into embossed high tensile sheets, sheets perforated with collared holes, rods, flat strips, chains or springs.

The primary strength elements 31, as typically disposed within the matrix 32, will form a plurality of planes such as the planes illustrated by the arrows 33 and 35. It may be desirable that the primary strength elements 31 be perforated or otherwise configured so that the filaments 23 can extend between the planes 31 and 33. This will enhance the distribution of the internal stresses throughout the matrix 32. For this reason, screens have been found particularly desirable for the primary strength elements 31. The filaments of the screen can be woven into many commonly known configurations such as the twilled square weave, the plain dutch weave and the braided mesh.

In one method of forming the structural material 21, a relatively fluid bonding material 27 is poured directly upon the filaments 23 to impregnate the interstices of the wool 25. In such a method it may be desirable to provide the wool 25 with a generally open configuration to enhance the impregnation of the interstices. When the impregnation of the wool 25 has been substantially completed, the filaments 23 can be compressed prior to solidification of the bonding material 27 to increase their interlocking characteristics and to provide the wool 25 and the structural material 21 with a desired density.

Thermosetting resins can be obtained in a partially cured solid state and formed to a generally planar configuration. In this state these resins are heated to cause liquification and polymerization. When cooled, the resin forms a solid, high strength material. In one method of forming the matrix 32 from such a bonding material 27, the filaments 23 can be interlocked to form several layers 41, 43 and 45 of the wool 25. These layers of the wool can be alternated with layers 47 and 49 of the pre-cured thermosetting resin to form a laminate 51 as shown in an expanded view of FIG. 4. Primary strength elements, such as a pair of screens 53 and 55, can be added to the laminate 51, for example, between adjacent pairs of the layers 41, 43 and 45 of the wool 25. The bonding material 27, such as the resin, can then be heated to liquify the resin so that it impregnates the filaments 23 of the wool 25. The laminate 51 can be compressed and shaped to enhance the impregnation of the wool 25 and the interlocking characteristics of the filaments 23.

A further method of the present invention is particularly adaptable for use in forming composites, such as the beam 29 (FIG. 3), which include the matrix 32 and primary strength elements 31 which have a generally longitudinal configuration. In such a composite, it may be desirable to form the wool 25 into a relatively long and narrow sheet which may be wound upon a spool 61. The primary strength elements 31, such as the rod 63, can be rotated about its axis relative to the spool 61 so that the wool 25 is wound on the rod 63. Several of these wound primary strength elements 31 can be laid adjacent each other to form a plurality of layers shown generally at 65 and 67. These layers 65 and 67 can then be directly impregnated with a liquid bonding material 27 or alternated with layers 69 and 71 of a thermosetting resin in accordance with the method previously described.

It may be desirable to place at least the primary strength elements 31 in tension during the cooling of the bonding material 27. After the bonding material has been shrunk, typically by cooling, the tensile forces on the elements 31 can be released to provide the beam 29 with internal compressive stresses. This procedure may be particularly desirable if the beam 29 is to be placed in tensile stress. By prestressing the elements 31, the tensile strength of the beam 29 can be increased by the magnitude of the internal compressive stresses.

The structural material 21 may be used alone or in a composite as the matrix 32 between the primary strength elements 31. Due primarily to the high strength characteristics of the filaments 23 and the substantial mechanical interlocking of the filaments 23 to form the wool 25, the structural material 21 is provided with physical characteristics which far exceed those of the bonding material 27. Thus, the strength of the matrix 32 between the primary strength elements 31 can be significantly increased by the addition of the wool 25 to the bonding material 27. The structural material 21 is also relatively light in weight so that its strength per unit weight characteristics are highly desirable especially for aircraft structures. These physical characteristics of a stainless steel wool structural material 21 are set forth in the following table wherein specific data is tabulated for samples numbered 1 through 10.

It will be noted that samples 1 through 6 and 7 through 10 include a wool formed from stainless steel filaments 23 having diameters of 25 and 4 microns, respectively. While the specific gravity of each of the samples is also tabulated, it should be noted that the samples 1 and 2 include the FM-123 epoxy while samples 3 through 10 include the FR-7035 epoxy. These epoxies have specific gravities of 1.08 and 1.22, respectively.

The tensile strengths were determined by applying a static load of increasing magnitude to a sample of known cross sectional area until the sample failed. The static load at failure was divided by the cross sectional area to provide the data tabulated.

The shear strength of the material was ascertained by a common punch test whereby a force of increasing magnitude was applied to a punch of known circumference.

TABLE - METAL WOOL/EPOXY TEST DATA

| Sample No. | Wool - Diameter Stainless Steel Filaments (microns) | Specific Gravity Of Structural Material | Wool Volume (Percent) | Tensile Strength (lb/in$^2$) | Shear Strength (lb/in$^2$) | Tensile Strength/ Density ($10^6$in) |
|---|---|---|---|---|---|---|
| 1 | 25 | 1.3 | 7.8 | 8088 | 5237 | .172 |
| 2 | 25 | 1.84 | 11.3 | 9340 | 8441 | .14 |
| 3 | 25 | 2.46 | 18.8 | 11300 | 14586 | .127 |
| 4 | 25 | 2.76 | 23.3 | 18400 | 18600 | .18 |
| 5 | 25 | 3.4 | 33. | 25630 | 29505 | .209 |

TABLE - METAL WOOL/EPOXY TEST DATA—Continued

| Sample No. | Wool - Diameter Stainless Steel Filaments (microns) | Specific Gravity Of Structural Material | Wool Volume (Percent) | Tensile Strength (lb/in²) | Shear Strength (lb/in²) | Tensile Strength/ Density (10⁶in) |
| --- | --- | --- | --- | --- | --- | --- |
| 6  | 25 | 3.9  | 40.9 | 21400 | 33879 | .152 |
| 7  | 4  | 2.8  | 23.8 | 25300 | 12466 | .25  |
| 8  | 4  | 3.26 | 30.8 | 25500 | 11015 | .217 |
| 9  | 4  | 3.92 | 40.8 | 29500 | 20268 | .208 |
| 10 | 4  | 4.35 | 47.3 | 30499 | 26946 | .194 |

Of utmost importance, of course, is the fact that whereas the bonding material 27, such as the resin, is rated to fail under a stress of only 6,500 psi, the addition of the wool 25 to the bonding material 27 can provide the structural material 21 with characteristics for withstanding stresses in excess of 30,000 psi. If weight is a primary design goal, the structural material 21 can be formed in accordance with the sample numbered 7. It will be noted that the tensile strength-to-density ratio of this sample was 250,000 inch.

The tensile strengths of the structural material 21 for different percentages of stainless steel metal wool in the FR-7035 epoxy are plotted in the graph of FIG. 6. The line 75 illustrates the tensile strength of the structural material 21 including 4 micron filaments 23 while the line 79 illustrates the tensile strength of the material 21 including 25 micron filaments 23. It is of particular interest that the material 21 including the 25 micron and the 4 micron filaments 23 can withstand tensile stresses of 26,000 psi and 30,000 psi, respectively. It is also of importance that these high tensile strengths are achieved at wool concentrations of 35% and 40%, respectively. These highly desirable wool concentrations can be compared to those of the prior art wherein the strengths of the matrices typically have decreased above fiber concentrations of 19%.

FIG. 7 is a graph showing the shear strengths of the structural material 21 which include stainless steel wool in different percentages of weight by volume. The line 79 is associated with the 25 micron wool 25 and the line 81 is associated with the 4 micron wool 25. These materials 21 also include the FR-7035 epoxy which generally has a shear strength of 6,500 psi.

It is of particular interest to note that the sample which included the 25 micron filaments 23 generally had a greater shear strength than the samples which included the 4 micron filaments 23. In contradistinction, the samples which included the 4 micron filaments 23 generally had a higher tensile strength than the samples which included the 25 micron filaments 23.

The strength-to-density ratio of the structural material 21 is exceptionally high. This is particularly desirable where both strength and weight are design goals. It is this combination of physical properties which has made aluminum somewhat desirable for use in aircraft structures. However, as previously noted, the strength of aluminum is substantially degraded in castings due primarily to low ballistic tolerance and notch effects. To account for these deficiencies, safety factors are normally applied so that the strength-to-density ratio of a typical aluminum casting is less than 100,000 inches. It is particularly interesting to note that sample 7 of the structural material, which contains 23.8% stainless steel wool, had a strength-to-density ratio of 250,000 inches. In fact, each of the 10 samples had a strength-to-density ratio greater than that of a typical aluminum casting. Since the structural material 21 of the present invention is not susceptible to notch effects and has a very high ballistic tolerance, safety factors need not be applied to reduce the effective strength-to-density ratio of the material. It follows that the structural material 21 of the present invention provides an excellent substitute for aluminum castings particularly in those applications wherein low weight is a design goal.

Another characteristic of the material 21 is its ability to withstand fatigue. Anyone who has broken a wire by repeatedly bending the wire at a particular point can appreciate the fact that the tensile strength of a filament generally decreases with each bend of the filament. Fatigue tests on filaments are generally performed by repeatedly applying a constant tensile force to a filament until it fails. Each tension and release of the filament is referred to as a cycle. A series of these tests can be performed at different tensile forces to provide a fatigue characteristic for the filament wherein the percent of maximum tensile stress is plotted against the number of cycles to failure. The fatigue characteristics of various types of filaments is plotted in FIG. 8. The lines 83, 85, 87 and 89 are respectively associated with filaments of glass, aluminum, boron and steel. The cycles to failure with various percentages of maximum tensile stress is plotted as line 91 for the structural material 21 including stainless steel wool and epoxy.

It is significant to note that even after 1,000,000 cycles, the material 21 of the present invention retained 50% of its maximum tensile stress. If the material 21, such as the sample 10 in the Table, initially has a tensile strength of 30,000 psi, after 1,000,000 cycles the material 21 will have a tensile strength of 15,000 psi. With reference to the line 85, it will be noted that aluminum, which typically has a tensile strength of 40,000 psi, retains only 20% of its maximum tensile strength after 1,000,000 cycles. With this degree of fatigue, it follows that aluminum would have a tensile strength of only 8,000 psi. Therefore, in a fatigue environment, the structural material 21 of the present invention would provide approximately twice the tensile strength of a solid metal such as aluminum.

All of these characteristics provide the structural material 21 with significant advantages particularly for applications wherein high strength, low density, and high fatigue tolerances are design goals. The strength of the material 21 can be directly related to the filaments 23 which are embedded in the bonding material 27. These high strength filaments 23 are so interlocked with themselves that they form the wool 25 which has a structural integrity of its own. The filaments 23 can be formed from metals to provide the filaments 23 with significant aspect ratios. This not only increases the homogeneous nature of the material 21 but also increases the distribution of stresses between the laminar planes 33 and 35 of a composite such as the beam 29. If the filaments 23 are formed from metal, they can be work hardened to provide each of the filaments 23 with a significant tensile strength. This additional strength of the wool provides the material 21 with a strength-to-density ratio which approaches that of aluminum.

Even after a significant number of fatigue cycles, the structural material 21 still maintains approximately 50% of its maximum tensile strength. This characteristic cannot even be matched by filaments of solid steel or boron. Furthermore, beyond 10,000 fatigue cycles, the strength of the material 21 actually surpasses that of aluminum.

Although the invention has been described with reference to specific embodiments, it will be appreciated by those skilled in the art that the invention can be otherwise embodied so that its scope should be limited only with reference to the following claims.

What is claimed is:

1. A structural material comprising:
    a plurality of flexible, randomly oriented and entangled metal filaments which are mechanically interlocked with each other to form a metal wool;
    said metal filaments having a substantial length-to-size ratio with an aspect ratio greater than 12,000 to provide said structural material with substantially isotropic strength characteristics;
    said metal filaments having a circular cross section, and
    a bonding material disposed within the interstices of said metal wool and adherently bonded to said metal filaments,
    whereby stresses applied to said structural material are resisted in a relatively uniform manner by said filaments.

2. The structural material of claim 1 wherein said filaments are formed of stainless steel.

3. The structural material of claim 1 wherein said bonding material is an epoxy resin.

4. The structural material of claim 1 wherein said metal wool is in a compressed state within said structural material, whereby stresses within said metal wool due to its compressed state are maintained within said structural material through contact of the bonding material with the metal filaments forming said wool.

5. The structural material of claim 4 wherein said wool is formed of stainless steel filaments.

6. The structural material of claim 1 including a plurality of primary strength elements positioned in laminar planes within said structural material with said metal wool extending between said laminar planes to increase the interlaminar shear strength of the structural material.

7. The structural material of claim 6 wherein said metal filaments are formed of stainless steel.

8. A method for forming a structural material including the steps of:
    providing a plurality of high strength flexible metallic filaments having a circular cross section with said filaments being randomly oriented and entangled and mechanically interlocked with each other to form a metal wool and with each of said filaments having a relatively high length-to-size ratio to provide an aspect ratio greater than 12,000;
    impregnating the interstices of the metal wool with a relatively fluid bonding material;
    compressing said metal wool to place said metal filaments in a stressed condition after substantially completing the impregnation of the wool with the relatively fluid bonding material, and
    hardening said fluid bonding material to form a bond between the bonding material and the metal filaments with the metal filaments in a stressed condition.

9. The method of claim 8 wherein said metal filaments are formed of stainless steel.

10. The method of claim 8 wherein said bonding material is an epoxy resin.

* * * * *